UNITED STATES PATENT OFFICE.

CHARLES W. HILL, OF EDGEWOOD, PENNSYLVANIA, ASSIGNOR TO WESTINGHOUSE ELECTRIC & MANUFACTURING COMPANY, A CORPORATION OF PENNSYLVANIA.

SOLDER.

1,333,619.     Specification of Letters Patent.     Patented Mar. 16, 1920.

No Drawing.     Application filed July 22, 1918. Serial No. 245,976.

*To all whom it may concern:*

Be it known that I, CHARLES W. HILL, a citizen of the United States, and a resident of Edgewood, in the county of Allegheny and State of Pennsylvania, have invented a new and useful Improvement in Solders, of which the following is a specification.

My invention relates to compositions for soldering purposes, and it has for its object to provide an improvement upon the solder disclosed in an application filed by G. P. Luckey, March 13, 1918, Serial No. 222,108 and assigned to the Westinghouse Electric & Manufacturing Company.

The above-referred-to application discloses a lead-cadmium solder in which the cadmium may vary from 6% to 10%, the remainder of the alloy being lead. A preferred lead-cadmium solder is there stated as comprising substantially 91.5% lead and 8.5% cadmium. This cadmium-lead solder is preferable to solders previously known, for many purposes, due to the strength of the joint which it will form and to the fact that it melts at relatively high temperatures, such as from 250 to 300° C.

I have found that the addition of various quantities of zinc to the lead-cadmium solder disclosed in the above-referred-to application does not impair the desirable properties of the lead-cadmium solder and, at the same time, provides a solder having certain desirable and important additional properties. For instance, whereas the lead-cadmium solder will not flux well without employing zinc chlorid and will not flux at all with ammonium-chlorid mixtures, the lead-cadmium zinc solder will flux well with rosin, alcohol and ammonium-chlorid fluxes. Furthermore, the lead-cadmium zinc solder does not oxidize as readily as the lead-cadmium solder.

A lead-cadmium solder of the character described will dissolve and form a true alloy with only approximately 1% of zinc. When a higher percentage of zinc is present and the molten melt is allowed to cool slowly, a eutectic will separate and rise to the surface. However, if the molten melt is stirred and poured at once into molds the eutectic does not separate out, and it is possible to make lead-cadmium-zinc mixtures containing as high as 20% zinc in this manner, although those containing over 20% zinc are not good solders.

Good solders may be formed by employing from 0.5% to 10% zinc and the remainder lead and cadmium in substantially the proportions of from 6% to 10% cadmium and 94% to 90% lead. One solder which I have found to be very efficient comprises from 0.5% to 4% zinc and the remainder lead and cadmium in substantially the proportions of 8.5% cadmium to 91.5% lead.

The solder may be made by melting the lead and adding to the melt, the cadmium and zinc in order, care being taken not to allow the mixture to become over-heated because of danger of oxidization. The molten mass should be carefully stirred to render the mixture, or alloy, homogeneous and it may then be poured into suitable molds to give it proper shape for convenient handling.

The lead-cadmium-zinc solder thus formed has a melting range from 260 to 300° C. and has been satisfactorily employed in soldering copper, tin, zinc, lead and iron.

Although I have suggested a particular soldering composition, which is efficient and which possesses many desirable properties, it will be appreciated that I do not impose any restrictions upon the proportions of the ingredients employed, other than those set forth in the claims.

I claim as my invention:

1. A solder comprising a small but appreciable amount of zinc together with lead and cadmium in substantially the proportions of 6% to 10% cadmium and 94% to 90% lead.

2. A solder comprising from 0.5% to 10% zinc together with lead and cadmium in substantially the proportions of 6% to 10% cadmium and 94% to 90% lead.

3. A solder comprising from 0.5% to 4% zinc together with lead and cadmium in substantially the proportions of 8.5% cadmium to 91.5% lead.

4. A solder comprising from 0.5% to 1.5% zinc together with lead and cadmium in substantially the proportions of 8.5% cadmium to 91.5% lead.

5. A solder comprising from 0.5% to 10% zinc, together with lead and cadmium with the lead predominating.

6. A solder comprising from 0.5% to 14% zinc, together with lead and cadmium in substantially the proportions of 6% to 10% cadmium and 94% to 90% lead.

7. A solder comprising from 0.5% to 1.5% zinc, together with lead and cadmium in substantially the proportions of 6% to 10% cadmium and 94% to 90% lead.

In testimony whereof, I have hereunto subscribed my name this 29th day of June, 1918.

CHARLES W. HILL.